United States Patent
Payne (10) Patent No.: US 10,118,603 B2
(45) Date of Patent: Nov. 6, 2018

(54) SYSTEMS AND METHODS FOR TRAFFIC LEARNING

(71) Applicant: Toyota Motor Engineering & Manufacturing North America, Inc., Erlanger, KY (US)

(72) Inventor: Joshua D. Payne, Irvine, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/927,685

(22) Filed: Oct. 30, 2015

(65) Prior Publication Data

US 2017/0120890 A1    May 4, 2017

(51) Int. Cl.
*B60W 20/10* (2016.01)
*G01C 21/34* (2006.01)
*B60K 6/20* (2007.10)
*B60W 50/00* (2006.01)
*G05G 1/00* (2006.01)
(Continued)

(52) U.S. Cl.
CPC ............... *B60W 20/10* (2013.01); *B60K 6/20* (2013.01); *B60W 20/12* (2016.01); *B60W 50/0097* (2013.01); *G01C 21/3469* (2013.01); *G01C 21/3492* (2013.01); *G05G 1/00* (2013.01); *G08G 1/096833* (2013.01); *B60W 2050/146* (2013.01); *B60W 2510/244* (2013.01); *B60W 2530/14* (2013.01); *B60W 2540/30* (2013.01); *B60W 2550/14* (2013.01); *B60W 2550/20* (2013.01); *B60W 2550/402* (2013.01); *B60Y 2200/10* (2013.01); *B60Y 2300/182* (2013.01); *B60Y 2300/244* (2013.01); *B60Y 2400/61* (2013.01); *Y02T 10/84* (2013.01); *Y10S 903/93* (2013.01)

(58) Field of Classification Search
USPC .......................................................... 701/22
See application file for complete search history.

(56) References Cited

U.S. PATENT DOCUMENTS 6,745,109 B2 *   6/2004   Kojima .................. G06Q 50/06
                                                              700/28
8,374,740 B2     2/2013   Druenert et al.
(Continued)

FOREIGN PATENT DOCUMENTS

FR         3037025 A1 *   12/2016
WO         2013110711     8/2013

OTHER PUBLICATIONS

Machine Google Patents Translation of Gaudichon (FR 3037025 A1) dated Dec. 2016.*

*Primary Examiner* — Jean Paul Cass
(74) *Attorney, Agent, or Firm* — Dinsmore & Shohl LLP (57) ABSTRACT

Systems and methods for traffic learning are described. One embodiment of a method includes predicting a vehicle route of a vehicle, determining historical traffic data related to at least one segment along the vehicle route, and determining an energy traffic budget for electric power consumption of the vehicle along the vehicle route, where the energy traffic budget is learned from the historical traffic data. Some embodiments include creating a schedule for transitioning between gasoline power and electric power for the vehicle route, implementing the schedule as the vehicle traverses the vehicle route, and in response to encountering traffic along the vehicle route, implementing the energy traffic budget.

20 Claims, 7 Drawing Sheets

(51) Int. Cl.
  *G08G 1/0968* (2006.01)
  *B60W 20/12* (2016.01)
  *B60W 50/14* (2012.01)

(56) References Cited

U.S. PATENT DOCUMENTS

| | | | | |
|---|---|---|---|---|
| 8,407,007 B2* | 3/2013 | Blias | ................. | G01V 1/42 367/27 |
| 8,510,315 B2* | 8/2013 | Zheng | ................. | G06Q 10/08 707/723 |
| 8,718,932 B1* | 5/2014 | Pack | ................. | G01C 21/30 701/446 |
| 8,972,090 B2 | 3/2015 | Weslati et al. | | |
| 9,751,521 B2* | 9/2017 | Schwartz | ................. | B60W 10/10 |
| 2002/0096886 A1* | 7/2002 | Schmitz | ................. | B60K 6/46 290/40 C |
| 2003/0069665 A1* | 4/2003 | Haag | ................. | E04H 6/422 700/217 |
| 2008/0033640 A1* | 2/2008 | Amano | ................. | G01C 21/3476 701/414 |
| 2009/0063045 A1* | 3/2009 | Figueroa | ................. | G01C 21/26 701/414 |
| 2009/0112458 A1* | 4/2009 | Nakai | ................. | G01C 21/3415 701/533 |
| 2011/0029281 A1* | 2/2011 | Tsukamoto | ................. | G01C 21/3492 702/176 |
| 2011/0099171 A1* | 4/2011 | Van Buer | ................. | G01C 21/32 707/737 |
| 2011/0136620 A1* | 6/2011 | Gibson | ................. | B60W 10/02 477/64 |
| 2011/0166731 A1 | 7/2011 | Kristinsson et al. | | |
| 2011/0307166 A1* | 12/2011 | Hiestermann | ................. | G01C 21/32 701/119 |
| 2013/0142385 A1* | 6/2013 | Mathieu | ................. | G01C 21/365 382/103 |
| 2013/0151412 A1* | 6/2013 | Spahl | ................. | G06Q 20/40 705/44 |
| 2013/0158868 A1* | 6/2013 | Chen | ................. | G01C 21/3469 701/527 |
| 2013/0262349 A1* | 10/2013 | Bouqata | ................. | G06N 99/005 706/12 |
| 2013/0268152 A1* | 10/2013 | Koshizen | ................. | B60L 15/2045 701/22 |
| 2014/0092752 A1* | 4/2014 | Hui | ................. | H04L 67/32 370/242 |
| 2014/0379246 A1* | 12/2014 | Rose | ................. | B60W 50/00 701/123 |
| 2015/0120107 A1 | 4/2015 | Yu et al. | | |
| 2015/0224845 A1* | 8/2015 | Anderson | ................. | B60G 17/019 701/37 |
| 2015/0226563 A1* | 8/2015 | Cox | ................. | G07C 5/00 701/29.1 |
| 2015/0228129 A1* | 8/2015 | Cox | ................. | G07C 5/0808 701/29.1 |
| 2015/0268056 A1* | 9/2015 | Gueziec | ................. | H04W 4/029 701/117 |
| 2016/0075341 A1* | 3/2016 | Arvidsson | ................. | G01S 19/42 701/22 |
| 2017/0011324 A1* | 1/2017 | Truong | ................. | G06Q 10/063112 |
| 2018/0023692 A1* | 1/2018 | Gauthier | ................. | F16H 61/0213 |
| 2018/0079405 A1* | 3/2018 | Gaither | ................. | B60W 30/02 |

* cited by examiner

SYSTEMS AND METHODS FOR TRAFFIC LEARNING

TECHNICAL FIELD

Embodiments described herein generally relate to systems and methods for traffic learning and, more specifically, to determining an energy traffic budget for electric power of a vehicle to traverse a route.

BACKGROUND

Hybrid-electric vehicles have been developed to utilize an electric battery and a gasoline engine to power the vehicle. Depending on the particular situation, the hybrid-electric vehicle may automatically switch from electric to gasoline (and vice versa) depending on current driving patterns of the driver. As an example, if the user is driving in the city, electric power may activate to reduce gasoline consumption. If the vehicle is driving on the highway, gasoline may power the vehicle. While these current solutions may further extend the range of the vehicle, further efficiencies are not being realized. Accordingly, a need exists in the industry.

SUMMARY

Systems and methods for traffic learning are described. One embodiment of a method includes predicting a vehicle route of a vehicle, determining historical traffic data related to at least one segment along the vehicle route, and determining an energy traffic budget for electric power consumption of the vehicle along the vehicle route, where the energy traffic budget is learned from the historical traffic data. Some embodiments include creating a schedule for transitioning between gasoline power and electric power for the vehicle route, implementing the schedule as the vehicle traverses the vehicle route, and in response to encountering traffic along the vehicle route, implementing the energy traffic budget.

In another embodiment, a system for traffic learning includes a vehicle computing device that comprises a memory component that stores logic that, when executed by a processor, causes the system to predict a vehicle route of a vehicle, where the vehicle is configured to operate in an electric vehicle (EV) mode and a gasoline mode, determine at least one segment along the vehicle route, and receive historical traffic data related to the at least one segment along the vehicle route. In some embodiments, the logic causes the system to determine an energy traffic budget for electric power consumption of the vehicle along the vehicle route, where the energy traffic budget is created based on the historical traffic data, create a schedule for transitioning between the gasoline mode and the EV mode for the vehicle route, and in response to encountering traffic along the vehicle route, implement the energy traffic budget.

In yet another embodiment, a computing device includes a processor and a memory component. The memory component stores logic that, when executed by the processor, causes the computing device to predict a vehicle route of a vehicle, where the vehicle is configured to operate in an electric vehicle (EV) mode and a gasoline mode, and where the vehicle is configured to automatically change between the EV mode and the gasoline mode in response to a change command. In some embodiments, the logic causes the computing device to determine at least one segment along the vehicle route, determine historical traffic data related to the at least one segment along the vehicle route, and determine an energy traffic budget for electric power consumption of the vehicle along the at least one segment, where the energy traffic budget is created based on the historical traffic data. In some embodiments, the logic causes the computing device to create a schedule for transitioning between the gasoline mode and the EV mode for the vehicle route, implement the schedule as the vehicle traverses the vehicle route, where implementing the schedule comprises sending the change command to change between the EV mode and the gasoline mode according to the schedule, and in response to encountering traffic along the vehicle route, implement the energy traffic budget.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for traffic learning. Some embodiments may be configured to learn the amount of traffic on one or more individual segments of a driver's route and create and/or determine an energy traffic budget for the amount of energy for utilizing the electric vehicle (EV) mode of a hybrid vehicle along the route. Specifically, these embodiments may receive historical data regarding traffic along a driver's route. The historical traffic data may be received at any time (e.g., as the data is being compiled, after compiling, and/or as the driver is approaching the route), depending on the embodiment. The embodiments may then determine an energy traffic budget along the vehicle route from historical traffic data for timed release in EV mode. These embodiments may reserve the energy for EV mode for segments with higher traffic and revert to a schedule for segments with lower traffic. This may be particularly useful for plug-in hybrid vehicles with a charge depleting (EV) mode and a charge sustaining mode (utilizing gasoline) and the ability to switch back and forth given capacity in the EV range.

Once the system determines at least one segment of the route that will likely have high traffic, embodiments may determine and/or create an energy traffic budget for traversing the segments of higher traffic. A schedule may also be developed, which may or may not depend on traffic, for expending electric energy in EV mode. The embodiments may be configured to determine and/or create a revised energy traffic budget in real time if unexpected traffic occurs on the route or does not occur as predicted. Similarly, some embodiments may be configured to determine that the schedule will allow the vehicle to traverse the vehicle route and reach the destination with extra energy available (e.g., where energy expenditure was less than predicted). Such embodiments may be configured to alter the schedule to utilize at least a portion of the extra energy. Accordingly, the systems and methods for traffic learning incorporating the same will be described in more detail below.

Figure 1:
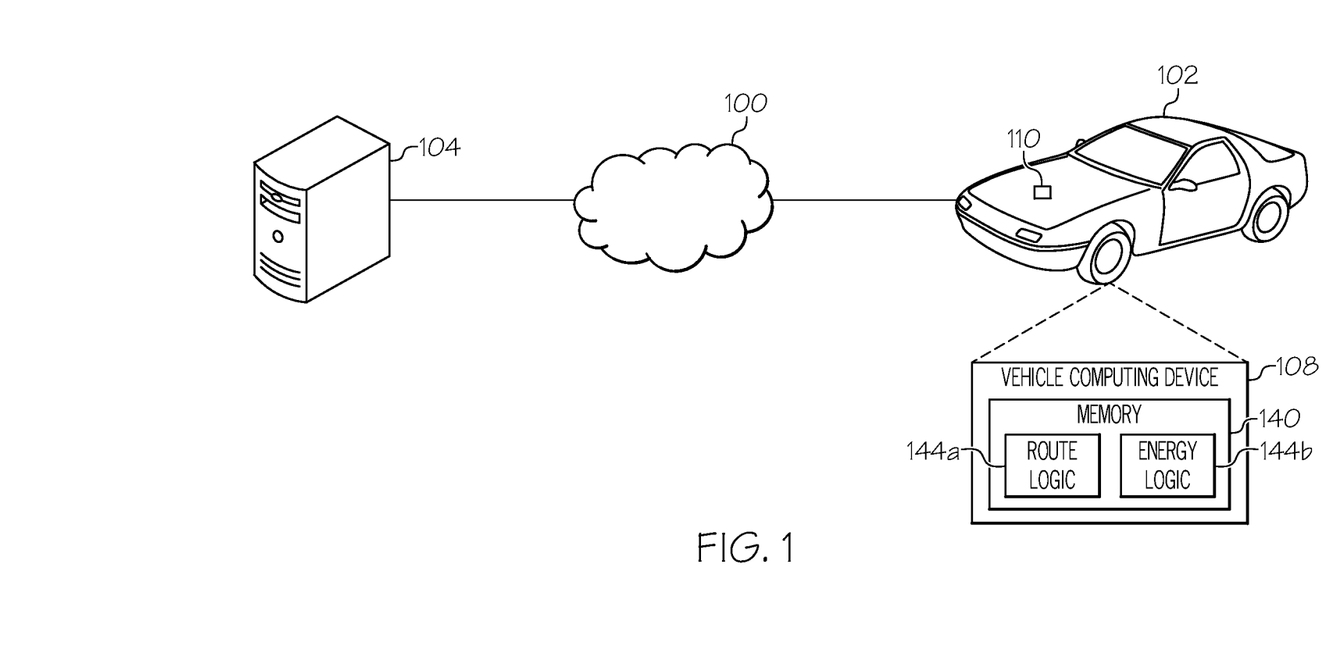
FIG. 1 depicts a computing environment for traffic learning, according to embodiments described herein.

Referring now to the drawings, FIG. 1 depicts a computing environment for traffic learning, according to embodiments described herein. As illustrated, the computing environment includes a network 100, a vehicle 102, and a remote computing device 104. The network 100 may include a wide area network, such as the internet, a mobile device network (such as 3G, 4G, LTE), a public switched telephone network (PSTN), etc. Additionally, the network 100 may include a local area network, such as wireless fidelity (WiFi), Bluetooth™, near field communication (NFC), etc. Accordingly, the network 100 may facilitate communication between two or more devices via an intermediary device or without an intermediary device. As such, depictions of communications between two devices that utilize the network 100 may be direct device-to-device communications, depending on the embodiment.

The vehicle 102 may be an electric/gasoline hybrid vehicle and/or other similar type of vehicle that utilizes a plurality of different fuel types. Accordingly, the vehicle 102 may include an electric vehicle (EV) mode and a hybrid vehicle (HV) mode, which for purposes described herein, may be referred to as a gasoline mode. Additionally, the vehicle 102 may include an engine that is capable of internal combustion and electric power and thus include a fuel reservoir and an electric reservoir, such as a battery. Depending on the particular embodiment, EV mode and gasoline mode may be selected via a change command initiated by a driver and/or automatically engaged via a change command based on a determination made by the vehicle computing device 108. The EV mode may be configured to utilize electric power exclusively such that the electric reservoir (e.g., the battery) is depleted during use. The gasoline mode may utilize gasoline or other fuel to power the vehicle 102 and utilize the kinetic energy from using the gasoline mode to recharge the electric reservoir.

The vehicle 102 may include one or more sensors for determining vehicle efficiency. As an example, the vehicle 102 may include a fuel consumption sensor 110, an electricity consumption sensor, and/or other sensors for determining efficiency of the vehicle 102. Additionally, the vehicle 102 may include a vehicle computing device 108 that includes a memory component 140, route logic 144a, energy logic 144b, and/or other components, such as a human-machine interface (HMI), which may be embodied as a vehicle display. As described in more detail below, the route logic 144a may include instructions for determining a route to be taken by the vehicle 102. The energy logic 144b may include instructions for determining and/or creating an energy traffic budget and a schedule for utilizing the electric energy along the route.

The remote computing device 104 may be configured with an energy traffic budget algorithm to determine an energy traffic budget associated with one or more vehicle routes that the vehicle 102 might traverse. Specifically, the vehicle computing device 108 may send historical energy expenditure data for segments or a route. The remote computing device 104 may utilize this historical traffic data to predict future energy expenditures. Additionally, the remote computing device 104 may be configured to communicate with the vehicle 102 to provide the predicted energy traffic budget data. If the vehicle 102 experiences a change in the traffic or energy expenditure than was predicted by the remote computing device 104, the vehicle computing device 108 may send the change in the energy traffic budget to the remote computing device 104 for updating the energy traffic budget algorithm. Some embodiments may be configured for the remote computing device 104 to additionally receive data from the vehicle 102, such as vehicle efficiency data, traffic data the vehicle 102 is experiencing, and/or other data.

Figure 2:
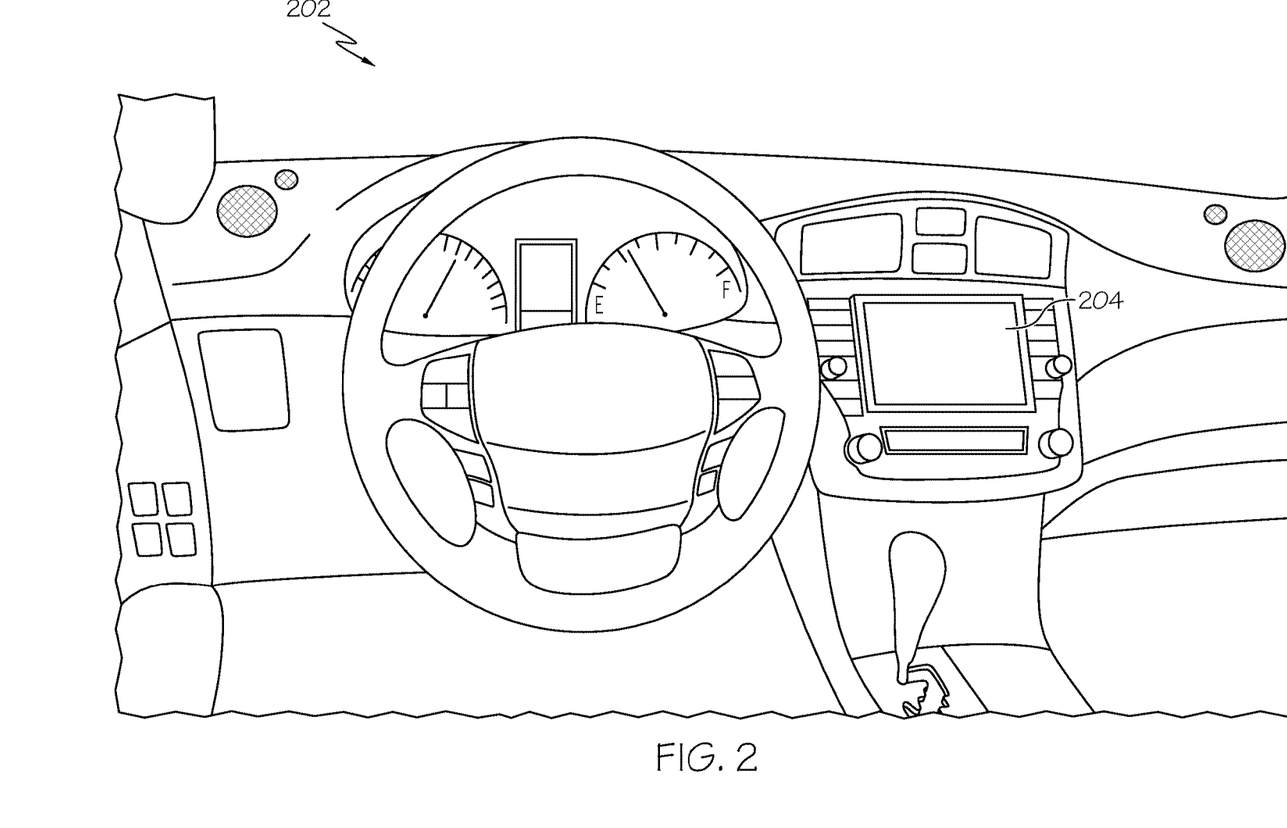
FIG. 2 depicts a vehicle interior for traffic learning, according to embodiments described herein.

FIG. 2 depicts a vehicle interior 202 for traffic learning, according to embodiments described herein. As illustrated, the vehicle interior 202 may include a vehicle display 204, which may include a touch screen, visual display, audio display, and/or other hardware and software components. As discussed above, the vehicle display 204 may be coupled to the vehicle computing device 108 (FIG. 1) and thus may provide one or more user interfaces for driver coaching.

Figure 3:
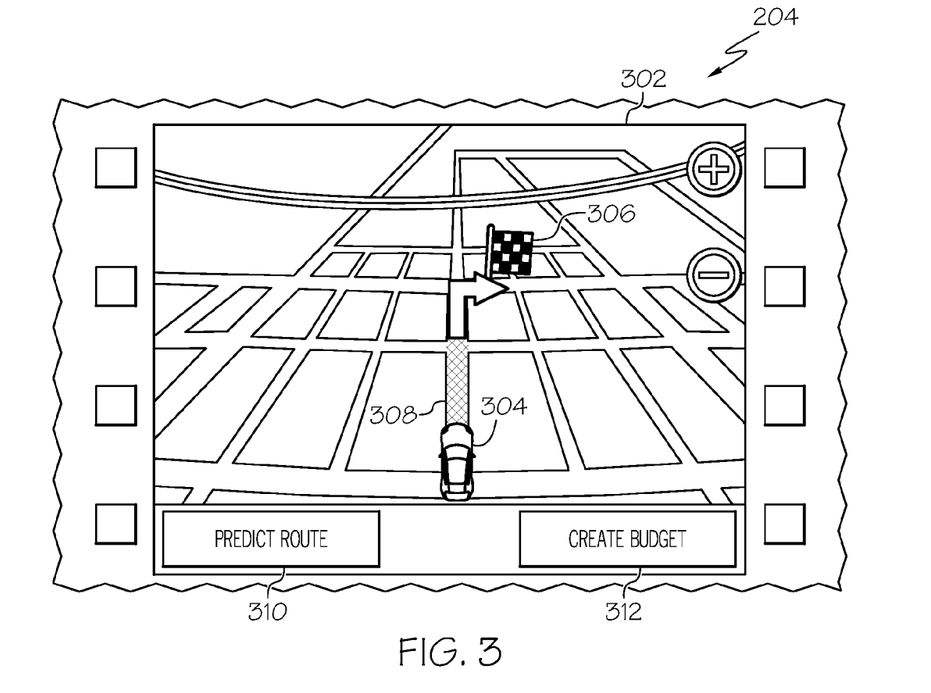
FIG. 3 depicts a user interface for creating an electric budget for a vehicle, according to embodiments described herein.

FIG. 3 depicts a user interface 302 for creating and/or determining an energy traffic budget for a vehicle 102, according to embodiments described herein. As illustrated, the vehicle display 204 may provide the user interface 302, which includes a predict route option 310 and a create budget option 312. In response to selection of the predict route option 310, the vehicle computing device 108 may determine the route 308 from a current position 304 of the vehicle 102 to a destination 306. The route 308 may be divided up into at least one segment and the vehicle computing device 108 may determine historical traffic data for at least a portion of the one or more segments. The determined historical traffic data may be received from the remote computing device 104, from the vehicle computing device 108, and/or from other vehicles. The historical traffic data may be provided as a binary indication (e.g., traffic or no traffic) or may be provided as one of a plurality of different conditions (e.g., no traffic, light traffic, moderate traffic, heavy traffic, etc.).

Depending on the particular embodiment, the traffic conditions may be displayed in the user interface 302. Regardless, the vehicle computing device 108 may utilize the historical traffic data, as well as data regarding the amount of electric energy currently in reserve in the vehicle 102 to predict the electric energy that will be spent to traverse one or more of the segments of the route (if utilizing EV mode). In response to selection of the create budget option 312, the vehicle computing device 108 may create an energy traffic budget to determine the amount of electric energy to spend to reach the destination 306. The energy traffic budget may be determined based on historical traffic data and/or at least one of the following: current electrical power reserves, the predicted traffic, and driving habits of a driver that is driving the vehicle 102, etc. As an example, if the vehicle computing device 108 determines that the vehicle 102 has previously traversed the route 308, the vehicle computing device 108 may utilize a previous energy traffic budget for creating the energy traffic budget for again traversing the route 308. The vehicle computing device 108 may also determine a schedule for traversing the vehicle route irrespective of traffic. Once the traffic has passed, the schedule may be resumed. In some embodiments, the vehicle computing device 108 may utilize historical data to determine the schedule. Thus, the vehicle 102 may utilize the schedule to traverse the vehicle route, until traffic is encountered. During the periods of higher traffic, the vehicle may utilize the energy traffic budget.

As an example, the vehicle computing device 108 may determine that the route 308 includes three segments, where the first and third segments have no traffic and the third segment has heavy traffic. Accordingly, the vehicle computing device 108 may determine that, due to the traffic on the second segment, the vehicle 102 should create an energy traffic budget based on this historical traffic data. The vehicle computing device 108 may also determine a schedule to reach the destination irrespective of traffic, but will minimize the gasoline utilized to reach the destination 306. If or when the vehicle 102 reaches traffic, the energy traffic budget may be implemented.

In some embodiments, the vehicle 102 may encounter different traffic and/or energy usage than the vehicle computing device 108 and/or remote computing device 104 predicted. In such a scenario, the vehicle computing device 108 may reassess the energy traffic budget planned for the vehicle 102. Based on the new data and the current electric reservoir, the vehicle computing device 108 may re-budget and/or reschedule utilization of the electric reservoirs. Depending on the particular embodiment, the budget and schedule may or may not be provided to the driver.

Figure 4:
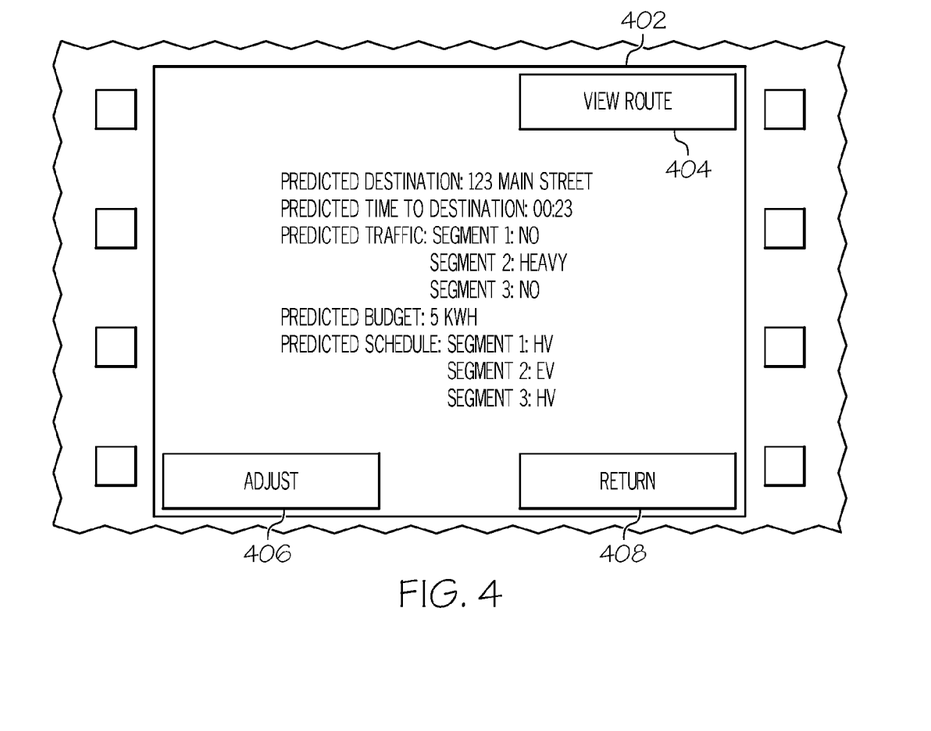
FIG. 4 depicts a user interface for providing prediction data related to a route, according to embodiments described herein.

FIG. 4 depicts a user interface 402 for providing prediction data related to a route 308, according to embodiments described herein. In response to selection of the create budget option 312 from FIG. 3, the user interface 402 may be provided. As illustrated, the user interface 402 provides information regarding the predicted destination 306, the predicted time to reach the destination 306, the predicted traffic, the predicted energy traffic budget, and the predicted schedule. A view route option 404, an adjust option 406, and a return option 408 are also provided. In response to selection of the view route option 404, the predicted route 308 may be provided.

In response to selection of the adjust option 406, the user may be provided with one or more options to manually adjust the route 308, energy traffic budget, and/or the schedule. Specifically, if the driver believes that the predicted route is incorrect, the user may be provided with one or more options to alter the route. If the energy traffic budget does not account for a waypoint, the driver believes the energy expenditure estimation is incorrect, or believes some other factor should be adjusted, the driver may be provided with an option to include the waypoint, adjust the traffic, and/or otherwise revise the energy traffic budget. Further, if the driver believes that the schedule should be adjusted, the driver may be provided with an option to create a revised schedule in place of the previously implemented schedule.

Figure 5:
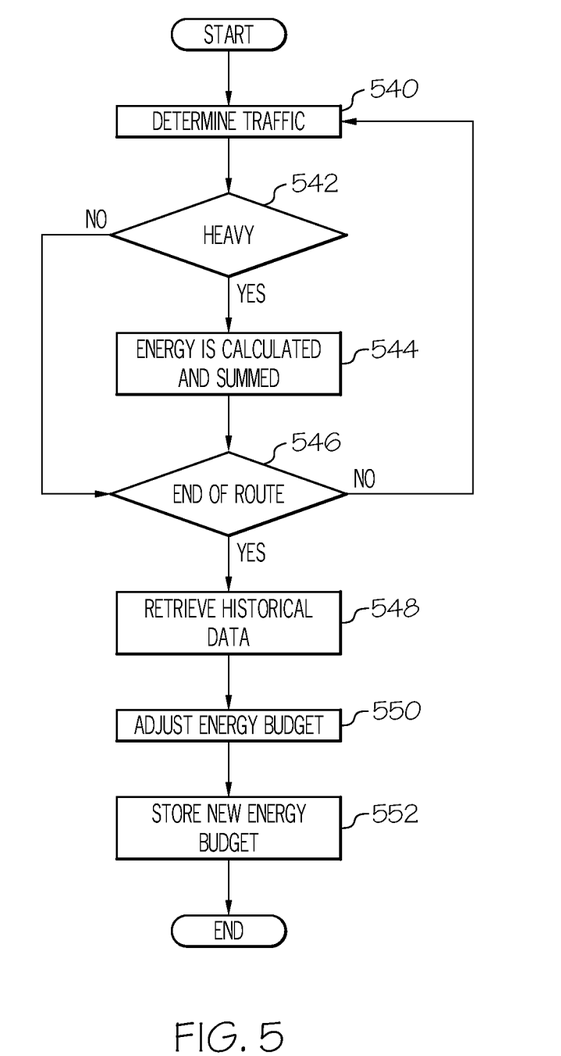
FIG. 5 depicts a flowchart for learning an energy traffic budget, according to embodiments described herein.

FIG. 5 depicts a flowchart for learning an energy traffic budget, according to embodiments described herein. As illustrated in block 540, a determination regarding the traffic level along a vehicle route may be determined from user input and/or historical data. As discussed above, one or more segments of the vehicle route may have light, moderate, or heavy traffic, and as such a determination may be made from historical traffic data, positioning data, other vehicle data, etc. In block 542, if the traffic for any particular segment is determined to be heavy, the flowchart may proceed to block 542. If not, the flowchart may proceed to block 544. In block 542 the energy (such as electrical energy) required to traverse that segment is calculated and summed with other segments along the route. In block 544, a determination may be made regarding whether the entirety of the vehicle route has been determined. If not, the process returns to block 540 for a next segment. If the vehicle route has been completed, a past energy traffic budget may be retrieved (e.g., from the vehicle computing device 108, the remote computing device 104, and/or from other sources. In block 546, the energy traffic budget may be adjusted with current data regarding traffic energy consumption. This may include information from other vehicles that are currently traversing the route and/or from data of the current vehicle efficiency of the vehicle 102. In block 548, the new energy traffic budget may be stored.

Figure 6:
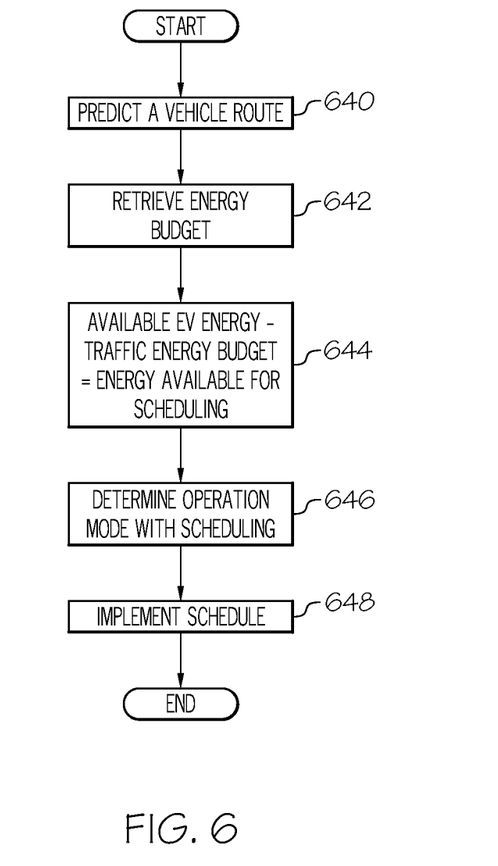
FIG. 6 depicts a flowchart for traversing a vehicle route using an energy traffic budget.

FIG. 6 depicts a flowchart for traversing a vehicle route using an energy traffic budget. In block 640, a vehicle route may be predicted, as described above. In block 642, the energy traffic budget for the vehicle route may be retrieved. The energy traffic budget may be determined as described with regard to FIG. 5 and/or via other process. Regardless, in block 644, a calculation of available energy−traffic energy traffic budget=energy available for scheduling may be utilized to determine the amount of energy that the vehicle 102 has available for the vehicle route. In block 646, the operating mode (such as gasoline mode and/or an EV mode) may be determined for at least a portion of the segments along the vehicle route. In block 648, the schedule may be implemented.

Figure 7:
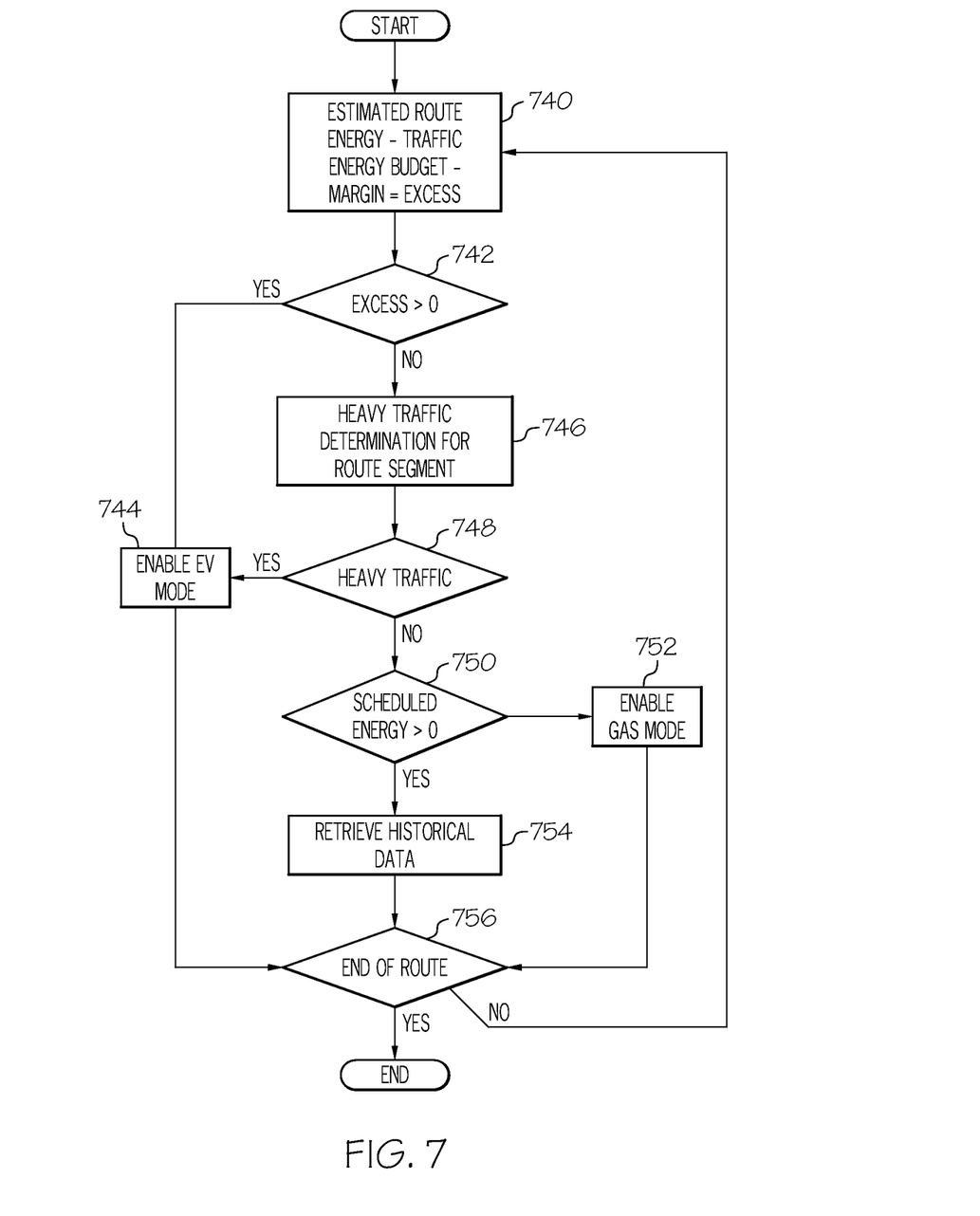
FIG. 7 depicts a flowchart for schedule implementation, according to embodiments described herein.

FIG. 7 depicts a flowchart for schedule implementation, according to embodiments described herein. As illustrated in block 740, a calculation may be performed such as estimated route energy−traffic energy traffic budget margin=excess to determine the extra energy that will result if the vehicle 102 utilizes the schedule along the vehicle route. In block 742, if the excess is greater than about zero, EV mode may be enabled and the flowchart may proceed to block 756. If the excess is not greater than zero, in block 746, a determination of heavy traffic for a route segment may be made. In block 748, if there is heavy traffic, the flowchart proceeds to block 744 to enable EV mode. If, at block 748, there is no heavy traffic on the segment, in block 750, a determination may be made regarding whether the scheduled energy is greater than about zero. If not, the gasoline mode may be enabled in block 752 and the process may proceed to block 756. If the scheduled energy is greater than about zero in block 750, historical data may be retrieved for implementation of a schedule. In block 756, a determination may be made regarding whether the end of the route has been analyzed. If not, the flowchart returns to block 740. If so, the process may end.

Figure 8:
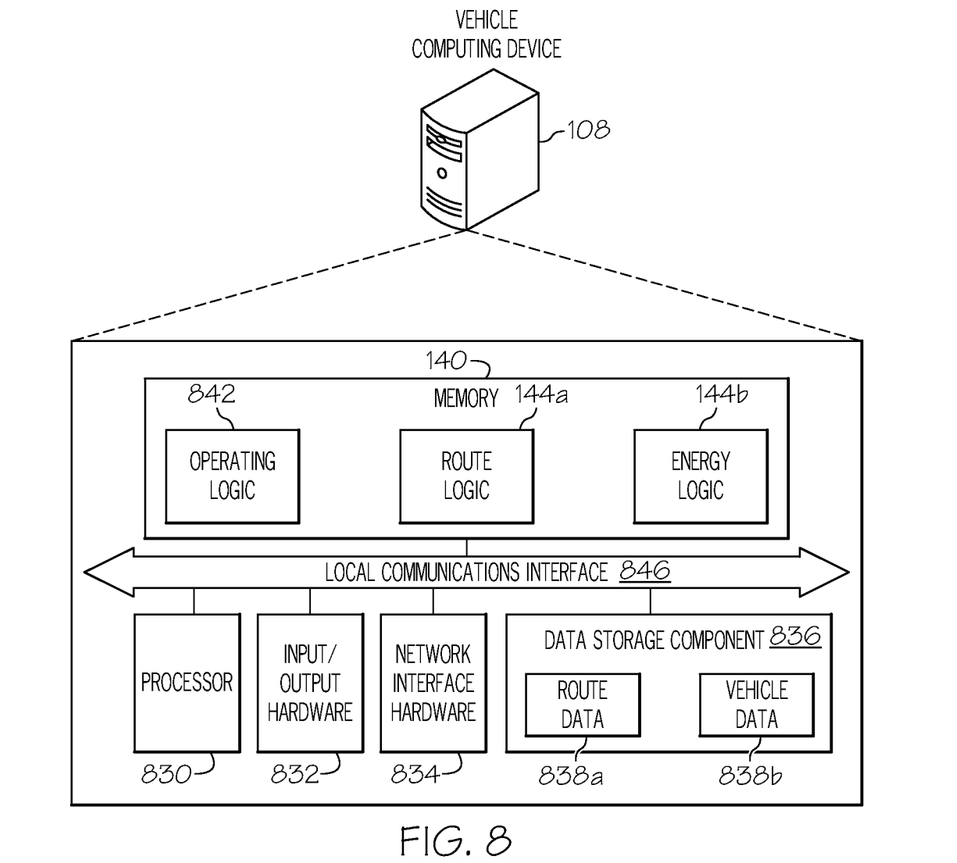
FIG. 8 depicts a vehicle computing device for traffic learning, according to embodiments described herein.

FIG. 8 depicts a vehicle computing device 108 for traffic learning, according to embodiments described herein. The vehicle computing device 108 includes a processor 830, input/output hardware 832, network interface hardware 834, a data storage component 836 (which stores route data 838*a*, vehicle data 838*b*, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 108 and/or external to the vehicle computing device 108.

The memory component 140 may store operating system logic 842, the route logic 144*a* and the energy logic 144*b*. The route logic 144*a* and the energy logic 144*b* may each include a plurality of different pieces of logic, each of which may be embodied as a computer program, firmware, and/or hardware, as an example. A local interface 846 is also included in FIG. 8 and may be implemented as a bus or other communication interface to facilitate communication among the components of the vehicle computing device 108.

The processor 830 may include any processing component operable to receive and execute instructions (such as from a data storage component 836 and/or the memory component 140). As described above, the input/output hardware 832 may include and/or be configured to interface with the components of FIG. 8.

The network interface hardware 834 may include and/or be configured for communicating with any wired or wireless networking hardware, including an antenna, a modem, a LAN port, wireless fidelity (Wi-Fi) card, WiMax card, mobile communications hardware, and/or other hardware for communicating with other networks and/or devices. From this connection, communication may be facilitated between the vehicle computing device 108 and other computing devices, such as those depicted in FIG. 1.

The operating system logic 842 may include an operating system and/or other software for managing components of the vehicle computing device 108. As discussed above, the route logic 144a may reside in the memory component 140 and may be configured to cause the processor 830 to predict a destination and/or a route 308 that the vehicle 102 will likely traverse. Similarly, the energy logic 144b may be utilized to determine the electric energy that will likely be expended during one or more segments of a route 308.

It should be understood that while the components in FIG. 8 are illustrated as residing within the vehicle computing device 108, this is merely an example. In some embodiments, one or more of the components may reside external to the vehicle computing device 108. It should also be understood that, while the vehicle computing device 108 is illustrated as a single integrated device, this is also merely an example. In some embodiments, the route logic 144a and the energy logic 144b may reside on different computing devices and/or the vehicle computing device 108 may be configured as a mobile device. As an example, one or more of the functionalities and/or components described herein may be provided by the remote computing device 104 and/or other computing devices, which may be coupled to the vehicle computing device 108 via the network 100. These computing devices may also include hardware and/or software for performing the functionality described herein.

Additionally, while the vehicle computing device 108 is illustrated with the route logic 144a and the energy logic 144b as separate logical components, this is also an example. In some embodiments, a single piece of logic may cause the vehicle computing device 108 to provide the described functionality.

As illustrated above, various embodiments for traffic learning are disclosed. These embodiments may further enhance energy savings by efficiently scheduling use of electric energy during predicted route segments of high traffic. Accordingly, less gasoline may be utilized to traverse a route.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for traffic learning. It should also be understood that these embodiments are merely exemplary and are not intended to limit the scope of this disclosure.

What is claimed is:

1. A method for traffic learning comprising:
predicting, by a computing device, a vehicle route of a vehicle;
determining, by the computing device, historical traffic data related to at least one segment along the vehicle route;
receiving, by the computing device, from an electricity consumption sensor that is coupled to the computing device, current electrical reserves of the vehicle;
determining, by the computing device, an energy traffic budget for electric power consumption of the vehicle along the vehicle route, wherein the energy traffic budget is learned from the historical traffic data and the current electrical reserves of the vehicle, and wherein the energy traffic budget represents an amount of electrical energy that will be reserved by the vehicle for use in the event that the vehicle encounters traffic along the route;
creating, by the computing device, a schedule for transitioning between gasoline power and electric power for the vehicle route without using the energy traffic budget or the electrical energy that is reserved for use by the energy traffic budget;
implementing, by the computing device, the schedule for the vehicle as the vehicle traverses the vehicle route; and
in response to the vehicle encountering traffic along the vehicle route, interrupting the schedule to implement the energy traffic budget for the vehicle.

2. The method of claim 1, wherein the energy traffic budget is created utilizing driving habits of a driver that is driving the vehicle.

3. The method of claim 1, further comprising providing an option to alter at least one of the following; the energy traffic budget, the schedule, and the vehicle route.

4. The method of claim 1, further comprising:
determining a change in the determined historical traffic data;
determining whether the change affects the energy traffic budget;
determining a revised energy traffic budget; and
implementing the revised energy traffic budget in place of the energy traffic budget.

5. The method of claim 1, further comprising in response to determining that the vehicle has passed the traffic, disengaging the energy traffic budget and resuming implementation of the schedule.

6. The method of claim 1, wherein the vehicle route is determined from at least one of the following: a user input and historical data.

7. The method of claim 1, wherein implementing the schedule comprises switching the vehicle from between electric vehicle (EV) mode and a gasoline mode according to the schedule.

8. A system for traffic learning comprising:
a vehicle that includes an electricity consumption sensor, wherein the electricity consumption sensor receives data associated with current electrical reserves of the vehicle; and a vehicle computing device that is coupled to the electricity consumption sensor and comprises a memory component that stores logic that, when executed by a processor, causes the system to perform at least the following:
predict a vehicle route of the vehicle, wherein the vehicle is configured to operate in an electric vehicle (EV) mode and a gasoline mode;
determine at least one segment along the vehicle route;
receive historical traffic data related to the at least one segment along the vehicle route;
determine an energy traffic budget for electric power consumption of the vehicle along the vehicle route, wherein the energy traffic budget is created based on the historical traffic data and the current electrical reserves and wherein the energy traffic budget represents an amount of electrical energy that will be reserved by the vehicle for use in the event that the vehicle encounters traffic along the route;
create a schedule for transitioning between the gasoline mode and the EV mode for the vehicle route, wherein the schedule does not utilize the electrical energy that is reserved use by the energy traffic budget; and
in response to the vehicle encountering traffic along the vehicle route, interrupt the schedule to implement the energy traffic budget.

9. The system of claim 8, wherein the logic further causes the system to perform at least the following:
determine a change in the historical traffic data;
determine whether the change affects the energy traffic budget;
determine a revised energy traffic budget; and
implement the revised energy traffic budget in place of the energy traffic budget.

10. The system of claim 8, wherein the logic further causes the system to implement the schedule as the vehicle traverses the vehicle route.

11. The system of claim 8, wherein the logic further causes the system to perform at least the following:
determine that the vehicle can traverse the vehicle route according to the schedule with extra energy; and
alter the schedule to utilize at least a portion of the extra energy along the vehicle route.

12. The system of claim 8, wherein the energy traffic budget is created utilizing driving habits of a driver that is driving the vehicle.

13. The system of claim 8, wherein the vehicle route is determined from at least one of the following: a user input and historical data.

14. The system of claim 8, wherein implementing the schedule comprises switching the vehicle from between the EV mode and the gasoline mode according to the schedule.

15. A computing device for traffic learning comprising:
an electricity consumption sensor that receives data related to current electrical reserves of a vehicle;
a processor that is coupled to the electricity consumption sensor; and
a memory component that is coupled to the processor and stores logic that, when executed by the processor, causes the computing device to perform at least the following:
predict a vehicle route of the vehicle, wherein the vehicle is configured to operate in an electric vehicle (EV) mode and a gasoline mode, and wherein the vehicle is configured to automatically change between the EV mode and the gasoline mode in response to a change command;
determine at least one segment along the vehicle route;
determine historical traffic data related to the at least one segment along the vehicle route;
determine an energy traffic budget for electric power consumption of the vehicle along the at least one segment, wherein the energy traffic budget is created based on the historical traffic data and the current electrical reserves of the vehicle and wherein the energy traffic budget represents an amount of electrical energy that will be reserved by the vehicle for use in the event that the vehicle encounters traffic along the route;
create a schedule for transitioning between the gasoline mode and the EV mode for the vehicle route, wherein the schedule does not include the energy reserved by the vehicle for the energy traffic budget;
implement the schedule as the vehicle traverses the vehicle route, wherein implementing the schedule comprises sending the change command to change between the EV mode and the gasoline mode according to the schedule; and
in response to the vehicle encountering traffic along the vehicle route, interrupt the schedule to implement the energy traffic budget for the vehicle.

16. The computing device of claim 15, wherein the logic further causes the computing device to perform at least the following:
determine a change in the traffic data;
determine whether the change affects the energy traffic budget;
in response to determining that the change affects the energy traffic budget, determine a revised energy traffic budget; and
implement the revised energy traffic budget in place of the energy traffic budget.

17. The computing device of claim 15, wherein the logic further causes the computing device to resume implementation of the schedule, in response to determining that the vehicle has passed the previously encountered traffic.

18. The computing device of claim 15, wherein the energy traffic budget is created utilizing at least one of the following: the traffic data, historical traffic data, and driving habits of a driver that is driving the vehicle.

19. The computing device of claim 15, wherein the vehicle route is determined from at least one of the following: a user input and historical data.

20. The computing device of claim 15, where in the logic further causes the computing device to send the energy traffic budget to a remote computing device.

* * * * *

UNITED STATES PATENT AND TRADEMARK OFFICE
CERTIFICATE OF CORRECTION

PATENT NO. : 10,118,603 B2
APPLICATION NO. : 14/927685
DATED : November 6, 2018
INVENTOR(S) : Joshua D. Payne It is certified that error appears in the above-identified patent and that said Letters Patent is hereby corrected as shown below:

In the Claims

In Column 09, Claim 08, Line 24, after "reserved", insert --for--

Signed and Sealed this
Twenty-fifth Day of December, 2018

Andrei Iancu
*Director of the United States Patent and Trademark Office*